US011909796B2

(12) United States Patent
Guo et al.

(10) Patent No.: US 11,909,796 B2
(45) Date of Patent: Feb. 20, 2024

(54) PROCESSING REAL-TIME-STREAMING-PROTOCOL (RTSP) PACKETS TO ENHANCE VIDEO-ON-DEMAND SERVICES

(71) Applicant: ARRIS Enterprises LLC, Suwanee, GA (US)

(72) Inventors: Jinji Guo, Guangdong (CN); Xing Feng, Guangdong (CN); Jianming Liang, Guangdong (CN); Feng Li, Guangdong (CN); Yuping Dong, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 450 days.

(21) Appl. No.: 17/296,658

(22) PCT Filed: Aug. 17, 2020

(86) PCT No.: PCT/CN2020/109474
§ 371 (c)(1),
(2) Date: May 25, 2021

(87) PCT Pub. No.: WO2022/036492
PCT Pub. Date: Feb. 24, 2022

(65) Prior Publication Data
US 2023/0144515 A1 May 11, 2023

(51) Int. Cl.
*H04L 12/26* (2006.01)
*H04L 65/612* (2022.01)
(Continued)

(52) U.S. Cl.
CPC ............ *H04L 65/612* (2022.05); *H04L 45/66* (2013.01); *H04L 65/65* (2022.05)

(58) Field of Classification Search
None
See application file for complete search history.

(56) References Cited

U.S. PATENT DOCUMENTS 8,843,643 B2 * 9/2014 Larson ................... H04L 63/08
709/227
9,544,183 B2 * 1/2017 Hluchyj ................ H04L 41/026
(Continued)

FOREIGN PATENT DOCUMENTS

CN 101626345 1/2010

OTHER PUBLICATIONS

International Search Report and the Written Opinion of the International Searching Authority dated May 13, 2021 in International (PCT) Application No. PCT/CN2020/109474.

*Primary Examiner* — Zewdu A Beyen
(74) *Attorney, Agent, or Firm* — Wenderoth, Lind & Ponack, L.L.P.

(57) ABSTRACT

An electronic device for processing real-time-streaming-protocol (RTSP) packets in a network to provide enhanced video-on-demand (VOD) services is provided. The electronic device includes a user interface, a non-transitory memory configured to store instructions including an application layer gateway (ALG) module and network service software, and a hardware processor. The hardware processor is configured to execute the instructions to store a list of mac-bridge clients that includes a MAC address and a MAC mask corresponding to each mac-bridge client, and determine whether at least one of the source and destination MAC address of a received RTSP packet is on the list. When at least one of the source and destination MAC address is on the list, the RTSP packet is processed using the network service software and a next RTSP packet is received; otherwise, the received RTSP packet is processed using the ALG module.

18 Claims, 4 Drawing Sheets

(51) Int. Cl.
*H04L 65/65* (2022.01)
*H04L 45/00* (2022.01)

(56) References Cited

U.S. PATENT DOCUMENTS

| | | |
|---|---|---|
| 10,637,750 B1 * | 4/2020 | Bollineni .............. H04L 43/026 |
| 2005/0267978 A1 | 12/2005 | Satapati |
| 2007/0005792 A1 | 1/2007 | Collet et al. |
| 2013/0329746 A1 | 12/2013 | Palacios Valverde et al. |
| 2018/0302367 A1 | 10/2018 | George, IV |

* cited by examiner

| MAC ADDRESS AND MAC MASK LIST /27 | | |
|---|---|---|
| 28 MAC-BRIDGE CLIENTS | 29 MAC ADDRESS | 30 MAC MASK |
| LAP TOP | 00:1A:C2:B7:00:47 | FF:FF:FF:FF:FF:00 |
| SMARTPHONE | F2:36:B2:14:A1:45 | FF:FF:FF:FF:00:00 |
| TABLET | 01:00:C7:10:33:B1 | FF:FF:F0:00:00:00 |
| PC | C9:01:E3:00:D4:15 | FF:FF:FF:FF:FF:00 |
| TV | AD:10:BB:03:FE:26 | FF:FF:FF:FF:FF:FF |
| SET-TOP-BOX | AD:10:BC:03:FE:26 | FF:FF:FF:F0:00:00 |

*FIG. 3*

PROCESSING REAL-TIME-STREAMING-PROTOCOL (RTSP) PACKETS TO ENHANCE VIDEO-ON-DEMAND SERVICES

TECHNICAL FIELD

The subject matter of the present disclosure relates generally to processing real-time-streaming-protocol (RTSP) packets to enhance video on demand services.

BACKGROUND

Gateways, access points (APs), or set-top boxes (STBs) used in wireless networks can include modems and can have difficulty playing video-on-demand (VOD) services when a mac-bridge feature is enabled on the modem. Modems typically use a real-time-streaming-protocol (RTSP) application layer gateway (ALG) module, which is designed to process RTSP packets sent by clients or client devices. However, the ALG module cannot correctly process RTSP packets sent by clients or client devices when the modem is in the mac-bridge mode and the Media Access Control (MAC) addresses of the clients or client devices are included on a mac-bridge client list.

When a modem of, for example, a gateway device is in a bridge mode, the ALG module is not loaded so RTSP packets sent by clients or client devices are processed by the modem and VOD services can be provided continuously. However, when the modem of the gateway device is in the mac-bridge mode, the ALG module is loaded and the modem works in a half-route and half-bridge mode. However, in the mac-bridge mode, the ALG module can have difficulty processing the RTSP packets sent by clients (e.g., when the MAC addresses of the clients or client devices are included on the mac-bridge client list), which causes the VOD services to fail.

Therefore, known techniques for processing mac-bridge client RTSP packets using ALG modules have drawbacks (e.g., when the mac-bridge feature is enabled on a modem and the MAC address of the client or client device is included on the mac-bridge client list).

Thus, it would be advantageous and an improvement over the relevant technology to provide an apparatus, method, and computer-readable recording medium capable of processing mac-bridge client RTSP packets using ALG modules when the mac-bridge feature is enabled on a modem and the MAC address of the client or client device is included on the mac-bridge client list, and while providing VOD services.

SUMMARY

An aspect of the present disclosure provides an electronic device capable of processing real-time-streaming-protocol (RTSP) packets in a network for providing enhanced video-on-demand (VOD) services. The electronic device includes a user interface, a non-transitory memory having instructions stored thereon that include an application layer gateway (ALG) module and network service software, and a hardware processor.

The hardware processor is configured to execute the instructions to store a list of mac-bridge clients in the non-transitory memory. The list includes a Media Access Control (MAC) address and a MAC mask corresponding to each mac-bridge client. Moreover, the hardware processor is configured to execute the instructions to receive a RTSP packet including a source and a destination MAC address, and determine whether at least one of the source and destination MAC address is on the list.

When at least one of the source and destination MAC address is on the list, the received RTSP packet is processed using the network service software and a next RTSP packet is received. When at least one of the source and destination MAC address is not on the list, the received RTSP packet is processed using the ALG module.

An aspect of the present disclosure provides a method of processing real-time-streaming-protocol (RTSP) packets in a network for providing enhanced video-on-demand services. The network communicatively connects an electronic device including a network controller and one or more client devices. The method includes storing a list of mac-bridge clients in the electronic device. The list includes a MAC address and a MAC mask corresponding to each mac-bridge client. Moreover, the method includes receiving, using the network controller, a RTSP packet including a source and a destination MAC address, and determining, using the network controller, whether at least one of the source and destination MAC address is on the list.

When at least one of the source and destination MAC address is on the list, the network controller is used to process the received RTSP packet using network service software executed by the network controller and a next RTSP packet is received. Otherwise, when at least one of the source and destination MAC address is not on the list, the received RTSP packet is processed using the ALG module executed by the network controller.

An aspect of the present disclosure provides a non-transitory computer-readable recording medium in an electronic device capable of processing real-time-streaming-protocol (RTSP) packets in a network for providing enhanced video-on-demand services. The non-transitory computer-readable recording medium stores instructions which when executed by a hardware processor performs the steps of the methods described above.

BRIEF DESCRIPTION OF THE DRAWINGS

In the drawings, like reference numbers generally indicate identical, functionally similar, and/or structurally similar elements.

FIG. 3 is an exemplary Media Access Control (MAC) Address and MAC Mask list table according to an embodiment of the present disclosure.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
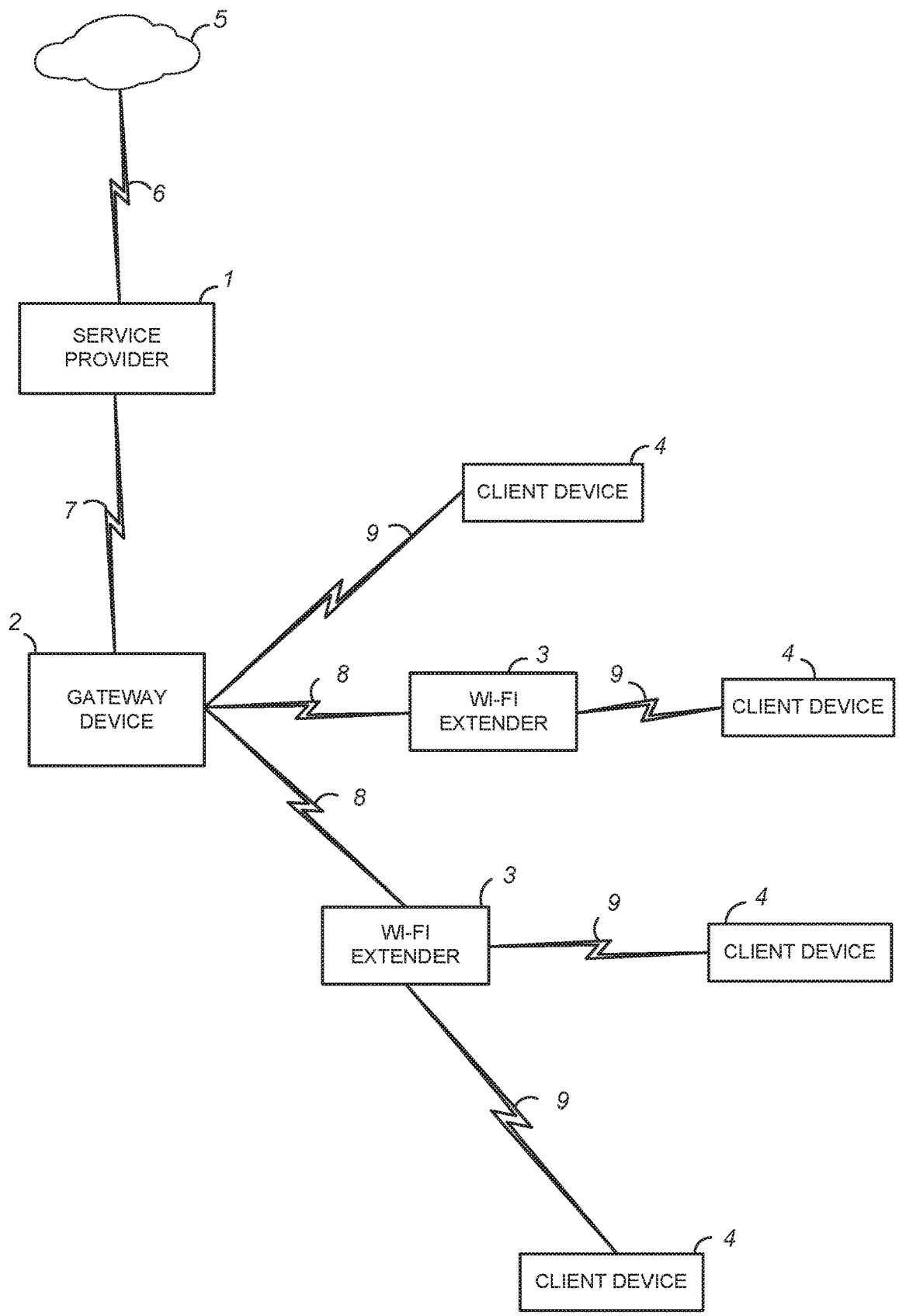
FIG. 1 is a schematic diagram illustrating an exemplary system for processing real-time-streaming protocol (RTSP) packets to enhance video-on-demand (VOD) services.

FIG. 1 is a schematic diagram of an exemplary system for processing real-time-streaming-protocol (RTSP) packets to provide enhanced video-on-demand services. As shown in FIG. 1, the main elements of the system include a gateway device 2 connected to the Internet 5 via a Service Provider (SP) 1 and also connected to different wireless devices such as Wi-Fi extenders 3 and client devices 4.

The system shown in FIG. 1 includes wireless devices (e.g., extenders 3 and client devices 4) that may be connected in one or more wireless networks (e.g., private, guest, iControl, backhaul network, or Internet of things (IoT) networks) within the system. Additionally, there could be some overlap between devices in the different networks. That is, one or more network devices could be located in more than one network. For example, wireless extenders 3 could be located both in a private network for providing content and information to a client device and also included in a backhaul network.

In FIG. 1, the SP 1 can be, for example, a streaming video provider or any computer for connecting the gateway device 2 to the Internet 5. The connection 6 between the Internet 5 and the SP 1 and the connection 7 between the SP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 7 can further include as some portion thereof a broadband mobile phone network connection, an optical network connection, or other similar connections. For example, the connection 7 can also be implemented using a fixed wireless connection that operates in accordance with, but is not limited to, 3rd Generation Partnership Project (3GPP) Long Term Evolution (LTE) or 5G protocols.

The gateway device 2 is a hardware electronic device that performs the function of a stand-alone cable modem or a combination modem and gateway device that combines the functions of a modem, access point, and/or a router for providing received content to network devices (e.g., client devices 4 and wireless extenders 3) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device 2 is connected to the wireless extenders 3 via connection 8. The connection 8 between the gateway device 2 and the wireless extenders 3 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands.

Additionally, the connection 8 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 6 can include connections to a media over coax (MoCA) network. One or more of the connections 8 can also be a wired Ethernet connection.

The wireless extenders 3 can be, for example, hardware electronic devices such as access points used to extend the wireless network by receiving the signals transmitted by the gateway device 2 and rebroadcasting the signals to, for example, client devices 4, which may be out of range of the gateway device 2. The wireless extenders 3 can also receive signals from the client devices 4 and rebroadcast the signals to the gateway device 2 or other client devices 4.

The connection 9 between the wireless extenders 3 and the client devices 4 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 9 may be implemented using a wireless connection that operates in accordance with, but is not limited to, RF4CE protocol, ZigBee protocol, Z-Wave protocol, or IEEE 802.15.4 protocol. Also, one or more of the connections 9 can also be a wired Ethernet connection.

The client devices 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 2. Additionally, the client devices 4 can be a TV, an IP/QAM STB or an SMD that is capable of decoding audio/video content, and playing over OTT or MSO provided content received through the gateway device 2.

Figure 2:
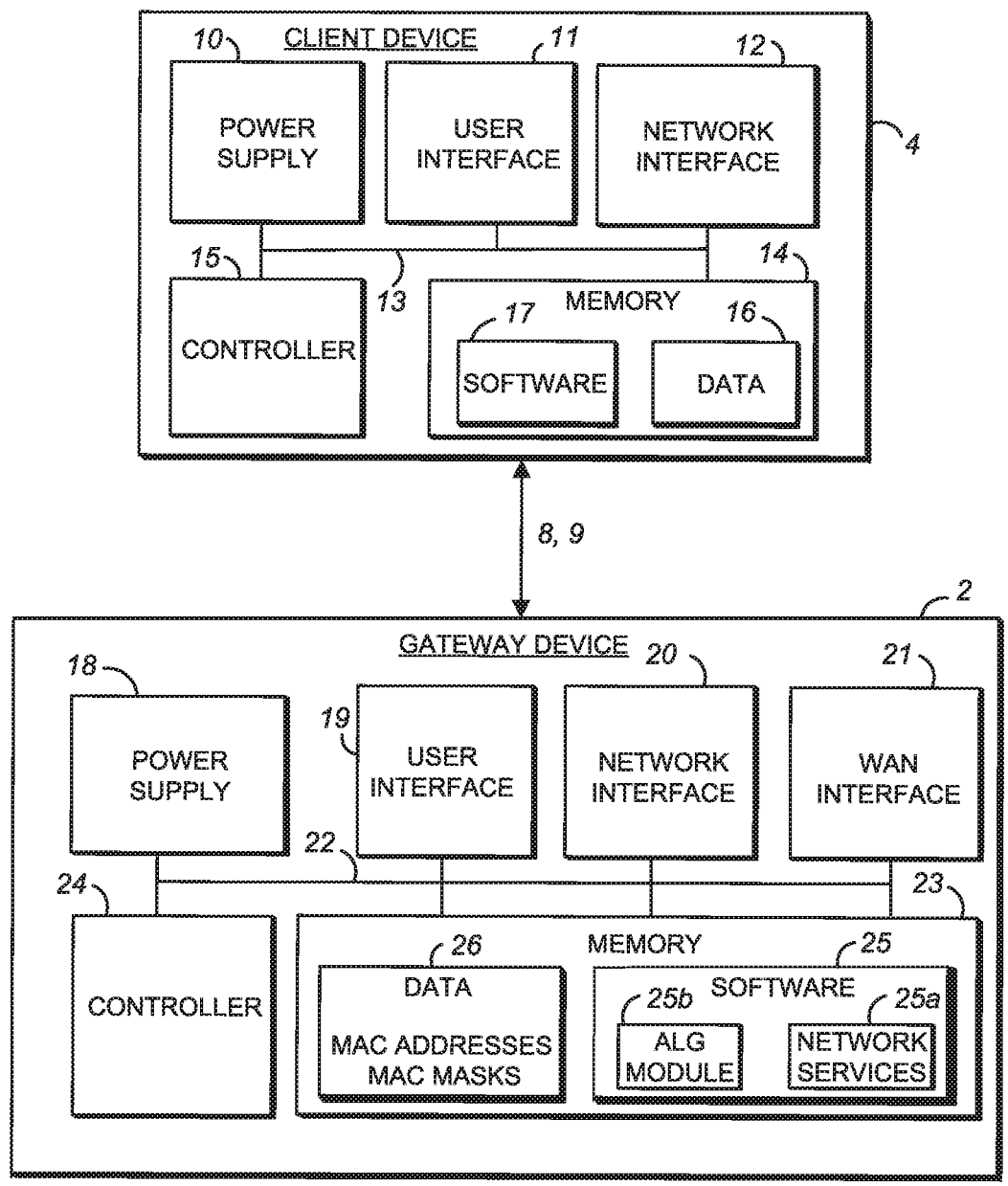
FIG. 2 is a more detailed schematic diagram illustrating an exemplary gateway device and an exemplary client device in the system of FIG. 1.

A detailed description of the example internal components of the gateway device 2 and the client devices 4 shown in FIG. 1 will be provided in the discussion of FIG. 2. However, in general, it is contemplated by the present disclosure that the gateway device 2 and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the gateway device 2 and the client devices 4 may be adapted to execute any operating system, including Linux, UNIX, Windows, MacOS, DOS, and ChromeOS as well as virtual machines adapted to virtualize execution of a particular operating system, including customized and proprietary operating systems. The gateway device 2 and the client devices 4 are further equipped with components to facilitate communication with other computing devices over the one or more network connections to local and wide area networks, wireless and wired networks, public and private networks, and any other communication network enabling communication in the system.

The respective connections 6, 7 between the SP 1 and the Internet 5 and between the SP 1 and the gateway device 2 shown in FIG. 1 are meant to be exemplary connections and are not meant to indicate all possible connections between the SP 1, gateway devices 2, and the Internet 5. Additionally, the respective connections 8, 9 between the gateway device 2, the wireless extenders 3, and the client devices 4 shown in FIG. 1 are meant to be exemplary connections and are not meant to indicate all possible connections between the gateway devices 2, wireless extenders 3, and client devices 4. Moreover, it is contemplated by the present disclosure that the number of SPs 1, gateway devices 2, wireless extenders 3, and client devices 4 is not limited to the number of SPs 1, gateway devices 2, wireless extenders 3, and client devices 4 shown in FIG. 1.

FIG. 2 illustrates a more detailed schematic diagram of an example gateway device 2 and an example client device 4 in the system for processing RTSP packets to enhance video-on-demand services according to an embodiment of the present disclosure. Although FIG. 2 shows one client device 4, the client device 4 in the figure is meant to be representative of the other client devices 4 shown in FIG. 1.

The client device 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the modem/gateway device 2. Additionally, the client device 4 can be a TV, an IP/QAM STB or an SMD that is capable of decoding audio/video content, and playing over OTT or MSO provided content received through the gateway device 2. As shown in FIG. 2, the client device 4 includes a power supply 10, user interface 11, network interface 12, a memory 14, and a controller 15.

The power supply 10 supplies power to the internal components of the client device 4 through an internal bus 13. The power supply 10 can be a self-contained power source such as a battery pack with an interface to be powered through an electrical charger connected to an outlet (e.g., either directly or by way of another device). The power supply 10 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 11 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4.

The network interface 12 includes various network cards, interfaces, and circuitry implemented in software and/or hardware to enable communications using the wireless protocols of connections 8 and 9 (e.g., as previously described with reference to FIG. 1).

The memory 14 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 14 can be used to store any type of data 16 and any type of instructions and/or software 17 associated with algorithms, processes, or operations for controlling the general functions and operations of the client device 4.

The controller 15 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 4. Communication between the components (e.g., 10-12, 14, and 15) of the client device 4 is established using the internal bus 13.

The gateway device 2 is a hardware electronic device that performs the function of a stand-alone cable modem or a combination modem and gateway device that combines the functions of a modem, access point and/or a router for providing received content to network devices (e.g., client devices 4 and wireless extenders 3) in the system. It is also contemplated by the present disclosure that the gateway device 2 can include the function of, but is not limited to, an IP/QAM STB or SMD that is capable of decoding audio/video content, and playing OTT or MSO provided content. As shown in FIG. 2, the gateway device 2 includes a power supply 18, user interface 19, a network interface 20, a WAN interface 21, a memory 23, and a controller 24.

The power supply 18 supplies power to the internal components of the gateway device 2 through the internal bus 22. The power supply 18 can be a self-contained power source such as a battery pack with an interface to be powered through an electrical charger connected to an outlet (e.g., either directly or by way of another device).

The user interface 19 includes, but is not limited to, push buttons, a keyboard, a keypad, a LCD, a TFT, a LED, a HD or other similar display device including a display device having touch screen capabilities so as to allow interaction between a user and the gateway device 2.

The network interface 20 includes various network cards, and circuitry implemented in software and/or hardware to enable communications using the communication protocols of connections 8 and 9 (e.g., as previously described with reference to FIG. 1).

The WAN interface 21 may include various network cards and circuitry implemented in software and/or hardware to enable communications between the gateway device 2 and the Internet 5 via the SP 1 using communications protocols in accordance with connection and 7 (e.g., as previously described with reference to FIG. 1).

The memory 23 includes a single memory or one or more memories or memory locations that include, but are not limited to, a RAM, a DRAM a memory buffer, a hard drive, a database, an EPROM, an EEPROM, a ROM, a flash memory, logic blocks of a FPGA, a hard disk or any other various layers of memory hierarchy. The memory 23 can be used to store any type of data 26, for example, Media Access Control (MAC) addresses and MAC masks for mac-bridge clients. The MAC addresses and MAC masks for mac-bridge clients may be assembled into a list and stored in any manner, for example, as a table. The list may be created by any person, for example, a system administrator operating the gateway device 2, and entered into the memory 23 in any manner.

The memory 23 can also be used to store any other software 25, for example, an application layer gateway (ALG) module 25b, network services software 25a, and/or any type of instructions associated with algorithms, processes, or operations for controlling the general functions and operations of the gateway device 2. The network services software 25a may additionally, or alternatively, be stored in any device in the system shown in FIG. 1 that facilitates correctly processing RTSP packets to provide continuous video-on-demand (VOD) services.

The ALG module 25b is designed to process RTSP packets sent by clients or client devices. However, the ALG module 25b cannot correctly process received RTSP packets sent by clients or client devices when a modem is in the mac-bridge mode and the MAC addresses of the clients or client devices are included on a mac-bridge client list. The network services software 25a executed by the controller 24 causes the gateway device 2 to process RTSP packets sent by clients when the modem is in mac-bridge mode and the MAC addresses of the clients or client devices are included on a mac-bridge client list.

The controller 24 controls the general operations of the gateway device 2 and includes, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the gateway device 2. Communication between the components (e.g., 18-21, 23 and 24) of the gateway device 2 is established using the internal bus 22.

Modems can have difficulty playing video-on-demand (VOD) services when a mac-bridge feature is enabled on the modem. Modems typically use a real-time-streaming-protocol (RTSP) application layer gateway (ALG) module, which is designed to process RTSP packets sent by clients or client devices. However, the ALG module cannot correctly process RTSP packets sent by clients or client devices when the modem is in the mac-bridge mode and the Media Access Control (MAC) addresses of the clients or client devices are included on a mac-bridge client list.

When a modem of a gateway device is in a bridge mode, the ALG module is not loaded so RTSP packets sent by clients or client devices are processed by the modem and VOD services can be provided continuously. However, when the modem of the gateway device is in the mac-bridge mode, the ALG module is loaded and the modem works in a half-route and half-bridge mode. However, in the mac-bridge mode, the ALG module can have difficulty processing the RTSP packets sent by clients (e.g., when the MAC addresses of the clients or client devices are included on the mac-bridge client list), which causes the VOD services to fail.

To address this problem, a list of mac-bridge clients is created that includes a Media Access Control (MAC) address and a MAC mask for each mac-bridge client. The MAC address and the MAC mask for each mac-bridge client are used to specify a set of MAC addresses for the respective mac-bridge client. When the gateway device 2 includes a modem and the modem is in mac-bridge mode, MAC addresses included in RTSP packets received by the gateway device 2 are compared against the specified set of MAC addresses of each client. If there is a match, the RTSP packet is not processed by the ALG module 25b. Rather, the RTSP packet is processed by the network services software 25b. As a result, VOD services can be continuously provided by processing the RTSP packets by either the network services software 25a or the ALG module 25b.

FIG. 3 is an exemplary Media Access Control (MAC) and MAC mask list table 27 according to an embodiment of the present disclosure. The MAC Address and MAC mask list table 27 may be stored in the memory 23 of the gateway device 2 and includes a list of mac-bridge clients 28. Each mac-bridge client 28 is associated with a corresponding MAC address 29 and MAC mask 30. The mac-bridge clients 28 may be client devices 4 as described herein with regard to FIGS. 1 and 2. More specifically, the mac-bridge clients 28 include, but are not limited to, a lap top computer, a smartphone, a tablet computer, a personal computer (PC), a TV, and a Set-Top-Box (STB). The present disclosure contemplates that the MAC Address and MAC mask list table 27 may additionally, or alternatively, include any type and number of mac-bridge clients 28.

The MAC mask 30 of a mac-bridge client 28 facilitates specifying a set of MAC addresses using a bit map to indicate the bits of the MAC addresses 29 that must fit or satisfy a specified MAC address attribute. The set may include one or more MAC addresses. For example, for the laptop computer, the MAC address 29 and the MAC mask 30 are, respectively, 00:1A:C2:B7:00:47 and FF:FF:FF:FF:FF:00. The MAC mask 30 indicates that all the MAC addresses starting with 00:1A:C2:B7:00 are included in the specified set of MAC addresses for the laptop computer. For the smartphone, the MAC address 29 and the MAC mask 30 are, respectively, F2:36:B2:14:A1:45 and FF:FF:FF:FF:00:00. Thus, the set of MAC addresses specified for the tablet computer includes all MAC addresses that start with F2:36:B2:14. For the tablet computer, the MAC address 29 and the MAC mask 30 are, respectively, 01:00:C7:10:33:B1 and FF:FF:F0:00:00:00. Thus, the set of MAC addresses specified for the smartphone includes all MAC addresses that start with 01:00:C. The set of MAC addresses is similarly specified for the PC as all the MAC addresses starting with C9:01:E3:00:D4 and for the STB as all the MAC addresses starting with AD:10:BC:0. For the TV, the MAC address 29 and the MAC mask 30 are, respectively, AD:10:BB:03:FE:26 and FF:FF:FF:FF:FF:FF. Thus, the set of MAC addresses specified for the TV includes only the MAC address 29 for the TV. It is contemplated by the present disclosure that the specified set of MAC addresses includes at least the MAC address of the respective mac-bridge client 28.

It is also contemplated by the present disclosure that RTSP packets communicated from the SP 1 using the connection 7 are received by the WAN interface 21 of the gateway device 2. The RTSP packets include a source MAC address and a destination MAC address which are compared against the MAC addresses in each specified set of MAC addresses in the MAC Address and MAC mask list table 27. If the source and/or destination MAC address matches a MAC address in any of the specified sets of MAC addresses, the network services software 25a stored in the memory 23 is executed by the controller 24 of the gateway device 2 to cause the gateway device 2 to process the received RTSP packet. Otherwise, the received RTSP packet is processed by the ALG software module 25b. Thus, it should be understood that the MAC mask 30 for each mac-bridge client 28 facilitates specifying a set of MAC addresses for that client 28 that enable identifying RTSP packets that are to be processed by the network services software 25a, not the ALG module 25b.

Figure 4:
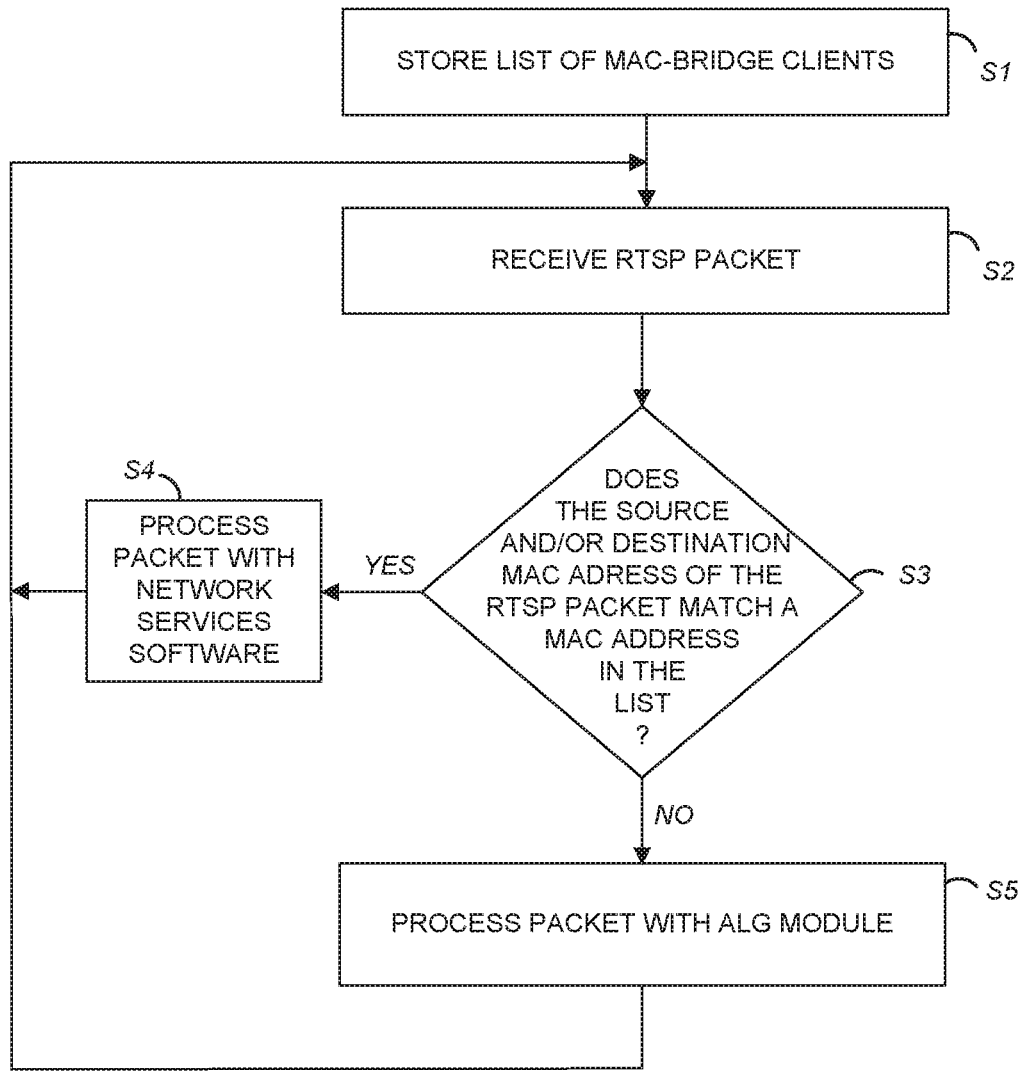
FIG. 4 is an exemplary method and algorithm for processing real-time-streaming protocol (RTSP) packets for providing enhanced video-on-demand (VOD) services.

FIG. 4 is an exemplary method and algorithm for processing real-time-streaming-protocol (RTSP) packets by a gateway device 2 including a modem operating in mac-bridge mode for providing enhanced video-on-demand services in accordance with an embodiment of the present disclosure. FIG. 4 illustrates exemplary operations performed when a real-time streaming protocol (RTSP) packet is received via the WAN interface 21 as shown in FIG. 2. Additionally, the exemplary method and algorithm of FIG. 4 includes operations that are performed by the software 25 executed by the controller 24 of the gateway device 2.

In step S1, the software 25 executed by the controller 24 causes the gateway device 2 to store a list of mac-bridge clients. Each of the mac-bridge clients is associated with a corresponding MAC address and a MAC mask. The MAC mask of each mac-bridge client facilitates specifying a set of MAC addresses using a bit map to indicate the bits of the MAC addresses that must fit to a specified MAC address attribute. For example, for a mac-bridge client having a MAC address of 00:1A:C2:B7:00:47 and a MAC mask of FF:FF:FF:FF:FF:00, the MAC mask indicates that all the MAC addresses starting with 00:1A:C2:B7:00 are included in the specified set of MAC addresses for the mac-bridge client.

In step S2, the software 25 executed by the controller 24 causes the gateway device 2 to receive a real-time-streaming-protocol (RTSP) packet using the WAN interface 21 and the connection 7. The RTSP packet includes a source MAC address and a destination MAC address. In step S3, the software 25 executed by the controller 24 causes the gateway device 2 to compare the source and destination MAC addresses against each MAC address in the specified set of MAC addresses for each mac-bridge client listed in the MAC address and MAC mask list table 27.

When the source MAC address, the destination MAC address, or both the source and destination MAC addresses match a MAC address in any of the specified sets of MAC addresses, in step S4, the network services software 25a executed by the controller 24 of the gateway device 2 causes the gateway device 2 to process the received RTSP packet. Next, the method continues in step S2 by receiving a next RTSP packet. However, when neither the source nor the destination MAC address matches a MAC address in any of the specified sets of MAC addresses, in step S5, the ALG module 25b executed by the controller 24 causes the gateway device 2 to process the received RTSP packet. Next, the method continues in step S2 by receiving a next RTSP packet.

Using the method and algorithm for processing RTSP packets received from clients by a gateway device including a modem operating in mac-bridge mode, facilitates continuously providing video-on-demand (VOD) services by processing received RTSP packets by either network services software or an ALG module and thus enhances user convenience and satisfaction.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, instructions, or algorithms. The software, applications, computer programs, instructions, or algorithms can be stored on a non-transitory computer-readable medium for causing a computer, such as the one or more processors, to execute the steps described in FIG. 4. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device capable of processing real-time-streaming-protocol (RTSP) packets in a network for providing enhanced video-on-demand (VOD) services, the electronic device comprising:
   a user interface;
   a non-transitory memory having instructions stored thereon, the instructions including an application layer gateway (ALG) module and network service software; and a hardware processor configured to execute the instructions to:

store a list of mac-bridge clients in the non-transitory memory, the list including a Media Access Control (MAC) address and a MAC mask corresponding to each mac-bridge client;

receive a RTSP packet including a source and a destination MAC address;

determine whether at least one of the source and destination MAC address is on the list;

when at least one of the source and destination MAC address is on the list, process the received RTSP packet using the network service software and receive a next RTSP packet; and when at least one of the source and destination MAC address is not on the list, process the received RTSP packet using the ALG module.

2. The electronic device according to claim 1, wherein the hardware processor further executes the instructions to specify a set of MAC addresses for each mac-bridge client in the list using the corresponding MAC address and MAC mask, wherein the corresponding MAC mask is a bit map indicating the bits of the corresponding MAC address to be used for determining MAC addresses to be included in the set.

3. The electronic device according to claim 2, wherein the hardware processor further executes the instructions to compare the at least one of the source and destination MAC address against the set of MAC addresses specified for each mac-bridge client.

4. The electronic device according to claim 1, wherein the hardware processor further executes the instructions to enable or disable a mac-bridge feature on the electronic device.

5. The electronic device according to claim 1, wherein the electronic device comprises a set-top box.

6. The electronic device according to claim 1, wherein the electronic device comprises a gateway device or an access point.

7. A method of processing real-time-streaming-protocol (RTSP) packets in a network for providing enhanced video-on-demand services, the network communicatively connecting an electronic device including a network controller and one or more client devices, the method comprising:

storing a list of mac-bridge clients in the electronic device, the list including a Media Access Control (MAC) address and a MAC mask corresponding to each mac-bridge client;

receiving, using the network controller, a RTSP packet including a source and a destination MAC address;

determining, using the network controller, whether at least one of the source and destination MAC address is on the list;

when at least one of the source and destination MAC address is on the list, processing, using the network controller, the received RTSP packet using network service software executed by the network controller and receiving a next RTSP packet; and when at least one of the source and destination MAC address is not on the list, processing, using the network controller, the received RTSP packet using an ALG module executed by the network controller.

8. The method according to claim 7 further comprising specifying a set of MAC addresses for each mac-bridge client on the list using the corresponding MAC address and MAC mask, wherein the corresponding MAC mask is a bit map indicating the bits of the corresponding MAC address to be used for determining MAC addresses to be included in the specified set.

9. The method according to claim 8 wherein determining, using the network controller, whether at least one of the source and destination MAC address is on the list comprises comparing the at least one of the source and destination MAC address against the specified set of MAC addresses for each mac-bridge client.

10. The method according to claim 7 further comprising enabling or disabling a mac-bridge feature on the electronic device.

11. The method according to claim 7 wherein the electronic device comprises a set-top box.

12. The method according to claim 7, wherein the electronic device comprises a gateway device or an access point.

13. A non-transitory computer-readable recording medium in an electronic device capable of processing real-time-streaming-protocol (RTSP) packets in a network for providing enhanced video-on-demand services, the network communicatively connecting the electronic device and one or more client devices, the non-transitory computer-readable recording medium storing instructions which when executed by a hardware processor cause the non-transitory recording medium to perform steps comprising:

storing a list of mac-bridge clients in the electronic device, the list including a Media Access Control (MAC) address and a MAC mask corresponding to each mac-bridge client;

receiving, using the network controller, a RTSP packet including a source and a destination MAC address;

determining, using the network controller, whether at least one of the source and destination MAC address is on the list;

when at least one of the source and destination MAC address is on the list, processing, using the network controller, network service software executed by the network controller and receiving a next RTSP packet; and when at least one of the source and destination MAC address is not on the list, processing, using the network controller, the received RTSP packet using an ALG module executed by the network controller.

14. The non-transitory computer-readable recording medium according to claim 13, further comprising specifying a set of MAC addresses for each mac-bridge client on the list using the corresponding MAC address and MAC mask, wherein the corresponding MAC mask is a bit map indicating the bits of the corresponding MAC address to be used for determining MAC addresses to be included in the specified set.

15. The non-transitory computer-readable recording medium according to claim 14, wherein determining whether at least one of the source and destination MAC address is on the list comprises comparing the at least one of the source and destination MAC address against the specified set of MAC addresses for each mac-bridge client.

16. The non-transitory computer-readable recording medium according to claim 13, further comprising enabling or disabling a mac-bridge feature on the electronic device.

17. The non-transitory computer-readable recording medium according to claim 13, wherein the electronic device comprises a set-top box.

18. The non-transitory computer-readable recording medium according to claim 13, wherein the electronic device comprises a gateway device or an access point.

* * * * *